United States Patent
Lawrence et al.

(10) Patent No.: US 10,612,687 B2
(45) Date of Patent: Apr. 7, 2020

(54) SHUTOFF VALVE ASSEMBLY AND SENSING SUBSYSTEM FOR DETECTING STATE OF SAME

(71) Applicant: Caterpillar Inc., Deerfield, IL (US)

(72) Inventors: Rodney Allen Lawrence, Frankfort, IN (US); Robert S. Caplinger, Thorntown, IN (US); Brandyn Anthony Stack, Lafayette, IN (US); Joseph John Stabnik, Rensselaer, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/940,428

(22) Filed: Mar. 29, 2018

(65) Prior Publication Data

US 2019/0301638 A1    Oct. 3, 2019

(51) Int. Cl.
*F16K 37/00* (2006.01)
*F02D 41/00* (2006.01)
*F02D 17/04* (2006.01)

(52) U.S. Cl.
CPC .......... *F16K 37/0041* (2013.01); *F02D 17/04* (2013.01); *F02D 41/0002* (2013.01); *Y10T 137/8242* (2015.04); *Y10T 137/8275* (2015.04)

(58) Field of Classification Search
CPC .................... Y10T 137/8242; Y10T 137/8275
USPC ....................................................... 251/302
See application file for complete search history.

(56) References Cited

U.S. PATENT DOCUMENTS

| | | | | |
|---|---|---|---|---|
| 4,381,100 A | * | 4/1983 | Schoenberg | F16K 3/188 137/554 |
| 4,537,386 A | * | 8/1985 | Krepela | F02D 17/04 251/302 |
| 4,546,954 A | * | 10/1985 | Bodnar | F16K 3/04 251/113 |
| 4,690,168 A | * | 9/1987 | Kihm | F16K 37/00 137/554 |
| 5,078,180 A | * | 1/1992 | Collins | B60R 15/00 137/554 |
| 6,032,921 A | * | 3/2000 | Krepela | F02D 9/06 123/198 F |
| 8,763,985 B2 | | 7/2014 | Miki et al. | |
| 10,012,162 B2 | * | 7/2018 | Chen | F02D 17/04 |
| 10,151,404 B2 | * | 12/2018 | Robson | F16K 37/0033 |
| 2001/0002599 A1 | * | 6/2001 | Apel | F02D 9/105 137/554 |

(Continued)

FOREIGN PATENT DOCUMENTS

EP    2354497 A1    8/2011
WO    1989005938 A1    6/1989

*Primary Examiner* — Robert K Arundale
(74) *Attorney, Agent, or Firm* — Brannon Sowers & Cracraft (57) ABSTRACT

A shutoff valve assembly for a fluid supply system includes a shutoff valve, with a valve member movable therein to shutoff fluid flow through a fluid conduit. The shutoff valve assembly includes a sensor target assembly with a sensor target located outside of the valve housing, and a rotator structured to transmit a rotation of the valve member within the valve housing to the sensor target. A proximity sensor is located outside of the valve housing and structured to produce a valve closing signal based on rotation of the sensor target that is indicative of initiating closing the shutoff valve. The design is adapted for relatively high temperature and high vibration environments.

17 Claims, 4 Drawing Sheets

(56) References Cited

U.S. PATENT DOCUMENTS

| | | | |
|---|---|---|---|
| 2003/0033867 A1* | 2/2003 | Posey | F16K 5/0647 |
| | | | 73/168 |
| 2007/0034264 A1 | 2/2007 | Kunz et al. | |
| 2007/0068581 A1* | 3/2007 | Kondo | F02D 9/1065 |
| | | | 137/554 |
| 2013/0068972 A1* | 3/2013 | Molavi | F02M 35/10255 |
| | | | 251/11 |
| 2014/0096850 A1* | 4/2014 | Filkovski | F16K 37/0033 |
| | | | 137/554 |
| 2017/0298842 A1 | 10/2017 | Stabnik et al. | |
| 2017/0314485 A1 | 11/2017 | Chen et al. | |

* cited by examiner

SHUTOFF VALVE ASSEMBLY AND SENSING SUBSYSTEM FOR DETECTING STATE OF SAME

TECHNICAL FIELD

The present disclosure relates generally to a shutoff valve in a fluid supply system, and more particularly to a strategy for detecting a state of the shutoff valve that is robust against harsh conditions.

BACKGROUND

All manner of shutoff valves are used in fluid systems to interrupt flow of fluid to a target. Shutting off the flow may be for purposes of avoiding overfilling a storage vessel or the like, halting draining, or for a variety of other purposes. In internal combustion engine systems, it can be desirable in certain applications to provide a mechanism for rapidly shutting off a supply of air to the engine. Various strategies for engine shutdown have been proposed over the years. It has been observed, however, that starving the engine of air is commonly the most effective and reliable way to stop operation quickly. Engines used in certain environments where combustible gases are present can present a particular need for rapid engine shutdown.

At a wellhead, for example, combustible gases such as natural gas can sometimes leak, or otherwise escape, from a bore hole or containment vessel. Engines operating in such environments can end up being supplied with extra fuel in the form of natural gas entering the air intake system, having undesirable consequences such as engine overspeeding. In other instances, engines can overspeed on other combustible fuel such as wood chips, alcohol, gasoline vapors, hydrogen, in enriched oxygen atmospheres, or even on their own oil supply or diesel fuel supply such as in the case of a stuck fuel rack or the like. Swing gate air shutoff valves, for instance, provide a gate that pivots within a housing to obstruct an air supply conduit in an engine air intake system. Such shutoff valves can experience relatively harsh conditions including vibration excitation from the engine, and temperature extremes.

United States Patent Application Publication No. 2015/0315983 relates to a method and apparatus for shutting down an engine by selectively preventing air from passing into the air intake. According to the '983 publication, a valve in the nature of a butterfly valve is electromagnetically actuated to move to a closed position to prevent air from passing into the engine air intake once one or more predetermined engine conditions have been detected. While the disclosed strategy may have certain applications, there are likely disadvantages relating to reliability, false tripping, or performance degradation over time.

SUMMARY OF THE INVENTION

In one aspect, a shutoff valve assembly for a fluid supply system includes a shutoff valve having a valve housing with a fluid conduit formed therein, and a valve member movable within the valve housing between an open position and a closed position to selectively shutoff fluid flow through the fluid conduit. The shutoff valve assembly further includes a sensor target assembly having a sensor target located outside of the valve housing, and a rotator. The rotator extends through the valve housing and couples the sensor target to the valve member, such that the sensor target rotates in response to the moving of the valve member. A proximity sensor is located outside of the valve housing and structured to produce a valve closing signal based on the rotation of the sensor target in response to the moving of the valve member.

In another aspect, a sensing subsystem for monitoring a shutoff valve in a fluid supply system includes a proximity sensor, and a support arm structured for supporting the proximity sensor at a location outside of a valve housing of the shutoff valve. The sensing subsystem further includes a sensor target having a base with an aperture formed therein that defines a center axis, for receiving a rotator that extends through the valve housing to transmit a rotation of a valve member in the shutoff valve to the sensor target. The sensor target further includes a head coupled to the base. The head includes a target surface defining an arc that extends circumferentially around the center axis.

In still another aspect, a method of monitoring a state of a shutoff valve in a fluid supply system includes rotating a sensor target located outside of the shutoff valve in response to moving a valve member in the shutoff valve between an open position and a closed position. The method further includes sensing the rotation of the sensor target by way of a proximity sensor located outside of the shutoff valve, and outputting a valve closing signal from the proximity sensor based on the sensing of the rotation of the sensor target.

DETAILED DESCRIPTION

Figure 1:
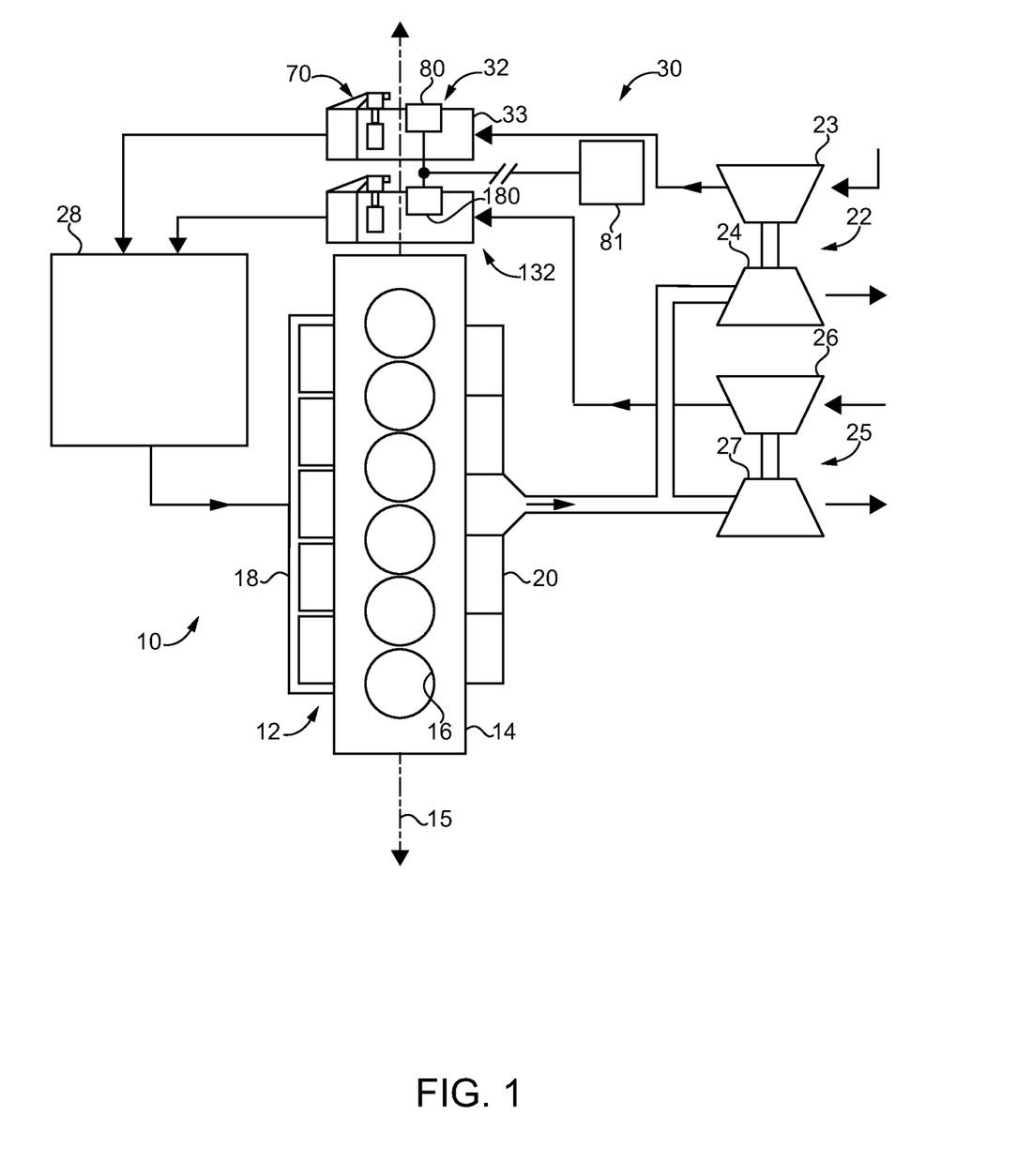
FIG. 1 is a schematic illustration of a machine system, according to one embodiment.

Referring to FIG. 1, there is shown a machine system 10 according to one embodiment, and illustrated in the context of an internal combustion engine system such as might be used for electrical power generation, propulsion power in a mobile machine, operating a pump or compressor, or in a variety of other applications. Machine system 10 (hereinafter "system 10") includes a machine 12 such as an internal combustion engine. Machine or engine 12 (hereinafter "engine 12") includes an engine housing 14 having a plurality of cylinders 16 formed therein. A plurality of pistons (not shown) may be movable one within each of cylinders 16 to rotate a crankshaft in a generally conventional manner. A crankshaft centerline is shown at 15. An intake manifold 18 is coupled with housing 14, as is an exhaust manifold 20. System 10 can further include a first turbocharger 22 having a compressor 23, and a turbine 24, structured to compress and supply a fluid such as air or air mixed with other fluids, to intake manifold 18. A second turbocharger 25 having a compressor 26 and a turbine 27 may be provided fluidly in parallel with turbocharger 22. A single turbocharger design, multiple sequential turbocharger stages, or still other arrangements are contemplated within the present context. Turbines 24 and 27 can receive hot exhaust gases from exhaust manifold 20, and rotate to induce rotation of compressors 23 and 26 to provide a flow of intake air to engine 12 in a generally known manner. An aftercooler 28 may be positioned fluidly between compressors 23 and 26 and receives parallel streams of compressed air for feeding to engine 12. Engine 12 may be coupled with a transmission and/or any other variety of torque transfer devices and loads. One application contemplated for the present disclosure is at a wellhead, on a frac rig, or an offshore oil or gas platform. As noted above, these and other environments can experience the presence of fugitive combustible gases, and it can be desirable to provide one or more mechanisms for shutting off airflow to engine 12 in the case of engine overspeeding or other problems that can result from the presence of combustible fluids or other materials in the stream of intake air for combustion.

System 10 further includes a fluid supply system 30 that is coupled with turbochargers 22 and 25 and positioned fluidly between turbochargers 22 and 25 and aftercooler 28. Fluid supply system 30 includes a shutoff valve assembly 32, and in the illustrated embodiment two shutoff valve assemblies 32 and 132, structured for shutting off flow of intake air from a corresponding one of compressors 23 and 26. It can be noted that each shutoff valve assembly 32 and 132 is positioned generally over crankshaft centerline 15. Those skilled in the art will be familiar with the harsh and typically high temperature conditions experienced by many fluid supply systems, and notably turbocharged air intake systems such as fluid supply system 30. Locations several feet above crankshaft centerline 15, approximately as shown, as well as numerous other mounting locations in or on an engine system, can experience significant vibration. Vibrations, and otherwise harsh conditions of high temperatures, temperature cycling, and thermal fatigue and/or wear-inducing conditions generally, can be associated with shutoff valve performance degradation, false tripping, and unreliability over time. Certain engines can be expected to operate continuously for hundreds of hours, and commonly thousands of hours between service intervals. As will be further apparent from the following description, shutoff valve assemblies 32 and 132, and associated components in particular, are contemplated to be resistant to undesired phenomena such as wear, false tripping, and still others, and equipped with robust sensing hardware and systems for monitoring valve state.

Figure 2:
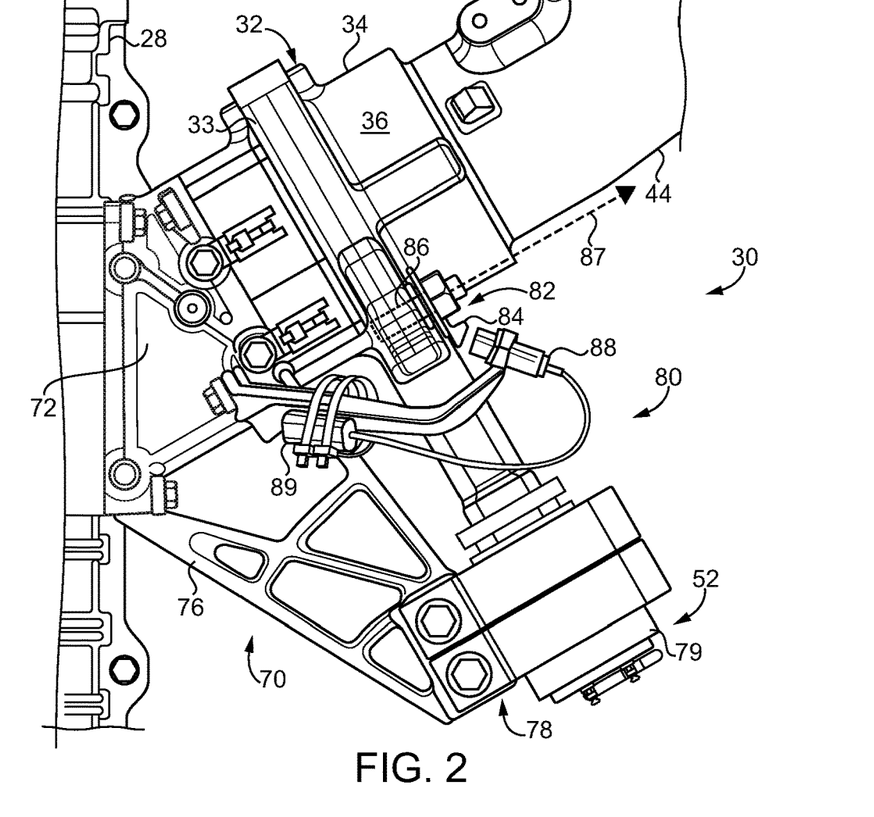
FIG. 2 is a diagrammatic illustration of parts of a fluid supply system suitable for use in the machine system of FIG. 1, according to one embodiment.
Figure 3:
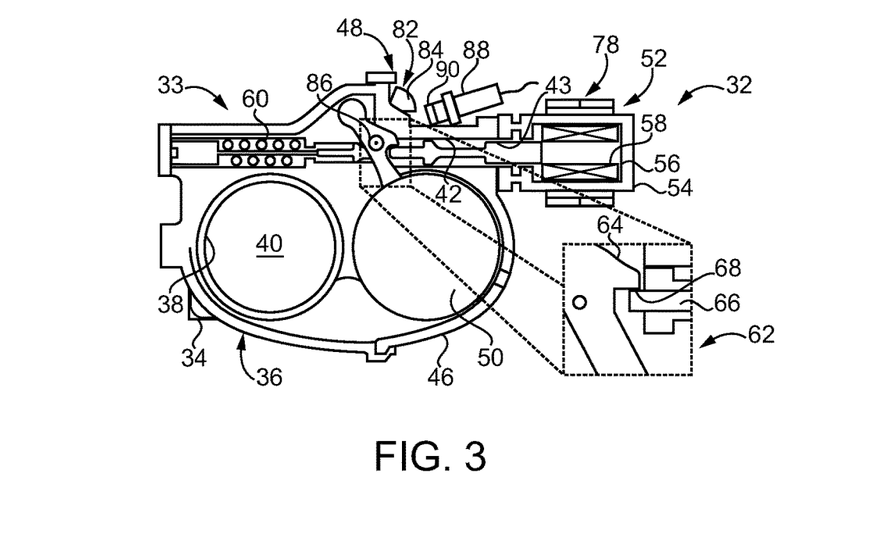
FIG. 3 is a sectioned diagrammatic view, including a detailed enlargement, through a shutoff valve assembly, according to one embodiment.

Referring also now to FIG. 2 and FIG. 3, there are shown, respectively, a top view of parts of fluid supply system 30 and a sectioned view through shutoff valve assembly 32 illustrating certain features in additional detail. Shutoff valve assembly 32 includes a shutoff valve 33 having a valve housing 34 that includes an outer housing surface 36, and an inner housing surface 38 forming a fluid supply conduit 40 for supplying a fluid to engine 12, and an actuator bore 42 that opens by way of an outer bore end 43 at outer housing surface 36. Shutoff valve 33 may be positioned fluidly between an intake pipe 44 or the like and an adjoining housing in fluid supply system 30, in the illustrated case being a housing of aftercooler 28. The description herein of shutoff valve assembly 32 should be understood to refer analogously to shutoff valve assembly 132 and associated components, which can be substantially identical to those of shutoff valve assembly 32, or substantially identical except certain parts being mirror images. Two or more than two shutoff valves in a machine system according to the present disclosure could be identical and interchangeable with one another in some embodiments. Shutoff valve 33 further includes a valve member 50 movable within valve housing 34 between an open position and a closed position to selectively shut off fluid flow through fluid conduit 40. An electrical valve actuator 52 extends through actuator bore 42. Valve member 50 can include a gate valve member movable across fluid conduit 40 between the open position and the closed position. Rather than a swinging or pivoting gate valve, in other embodiments a butterfly-type valve or still another valve type might be used.

Shutoff valve 33 may further include a valve-actuating spring 60 held in an energized state, such as a compressed state, within valve housing 34. Shutoff valve 33 may also include a latching mechanism 62 including a latch 64 latching valve member 50 open in opposition to a biasing force produced by valve-actuating spring 60. Electrical valve actuator 52 also includes a pin 66 engaged with latching mechanism 62 and structured to disengage from latching mechanism 62 in response to changing an electrical energy state, such as by energizing or deenergizing, of electrical valve actuator 52. A latching surface 68 of valve member 50 is shown in the detailed enlargement of FIG. 3 engaged with pin 66. Electrical valve actuator 52 also includes a solenoid subassembly 54 supported by valve housing 34 and extending outboard of actuator bore 42. Solenoid subassembly 54 can project generally outwardly from actuator bore 42 in a manner that can be understood to be cantilever supported, generally along an axis (not numbered) of actuator bore 42. Solenoid subassembly 54 can include a housing 56 with a solenoid 58 positioned therein. Energizing solenoid 58 can cause pin 66 to move toward solenoid 58 when energized, and allowing valve-actuating spring 60 to cause valve member 50 to swing or pivot from the open position to the closed position. Latching surface 68 can be seen in contact with pin 66 in the detailed enlargement.

It will be recalled that vibrational phenomena can be significant and relentless given the design of shutoff valve assembly 32 and its particular placement and positioning in a dynamic environment such as system 10. Wear in the vicinity of a surface configured analogously to latching surface 68, and wear on the associated pin due to such vibrational phenomena has been observed in earlier systems, and may contribute to undesired conditions or events such as false tripping of a shutoff valve. It will also be recalled that solenoid subassembly 54 is supported outboard of actuator bore 42, and in such a manner as to project outwardly of valve housing 34. It can be desirable to have a relatively robust and therefore heavy solenoid for shutoff valve actuation and, for this and other reasons, solenoid subassembly 54 could be expected to bend, reciprocate, twist, or experience other deflections during service. The present disclosure provides a strategy for minimizing such deflections and the potential effect on the structure and functioning of shutoff valve 33 by way of a unique support strategy for electrical valve actuator 52.

Figure 4:
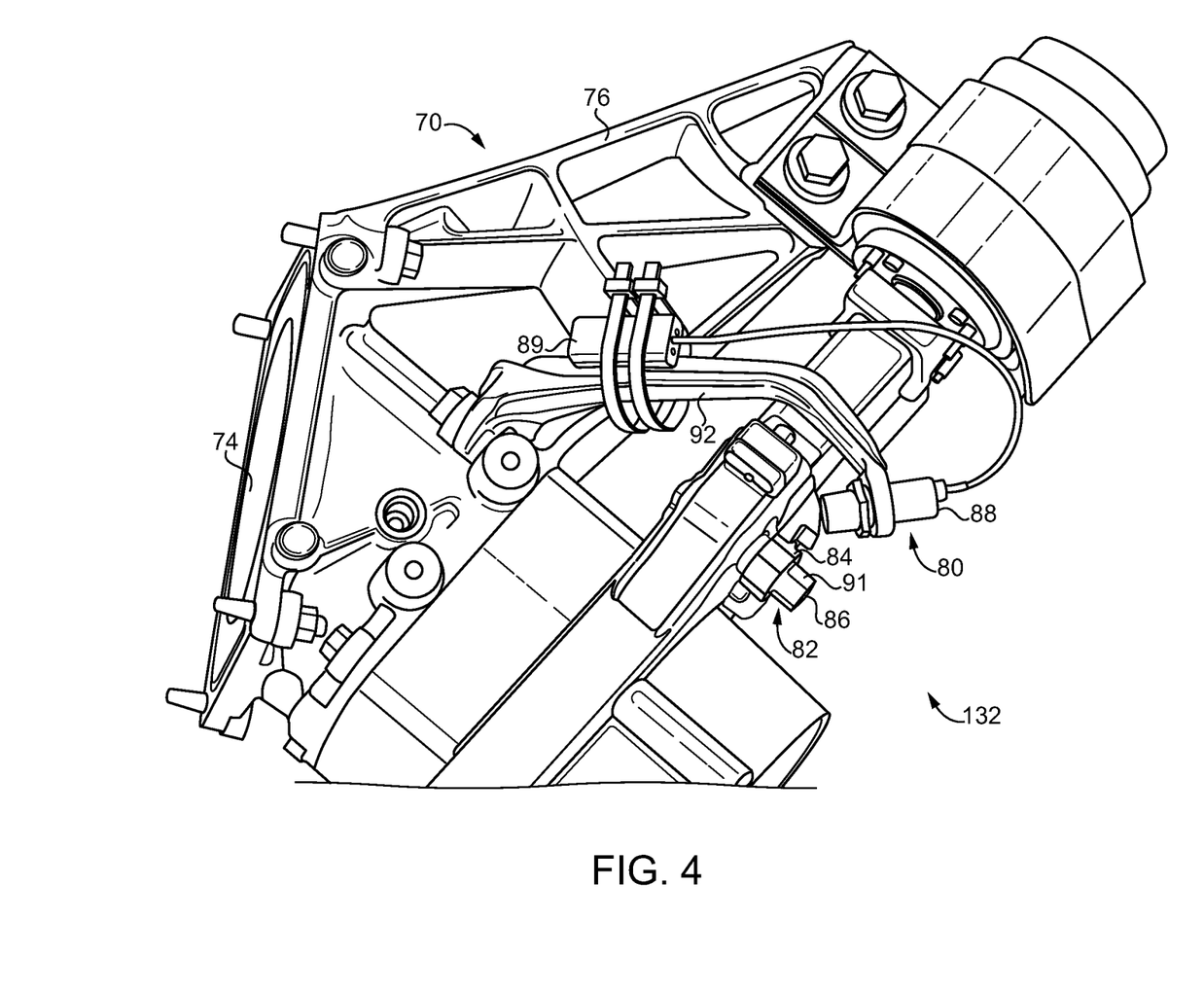
FIG. 4 is a diagrammatic view of a shutoff valve assembly, according to one embodiment.

To this end, fluid supply system 30 further includes a stabilizer 70 for electrical valve actuator 52. Stabilizer 70 can include a fitting 72 coupled to valve housing 34 as shown in FIG. 2. Referring also to FIG. 4, fitting 72 may also form an opening 74 to fluid supply conduit 40, and it can be understood to form a second fluid supply conduit extending inwardly from opening 74 to connect with fluid supply conduit 40. The term "supply" as used herein should not be taken to indicate a direction of flow. In the illustrated embodiments fluid flows from fluid supply conduit 40 out of shutoff valve assembly 32 by way of opening 74, however, the present disclosure is not thereby limited. Stabilizer 70 also includes a strongarm 76 extending between fitting 72 and solenoid subassembly 54 and a clamp 78 clamping strongarm 76 to solenoid subassembly 54. Fitting 72 and strongarm 76 can be formed integrally in a one-piece casting, but could be configured as separate components in other instances. Clamp 78 may be configured as one or more clamping straps that extend circumferentially around or circumferentially partly around solenoid subassembly 54, and are bolted to strongarm 76. A vibration-limiting grommet 79 may be clamped between and held in compression between clamp 78 and solenoid subassembly 54. Grommet 79 may include a silicone body or tape in a layered arrangement with a reinforcement, such as a metallic mesh, fabric, braid, or other reinforcement. Grommet 79 can assist in limiting vibration transfer between strongarm 76 and electrical valve actuator 52, with grommet 79 being resistant to tearing in response to shearing forces or the like. It can further be noted that strongarm 76 forms two connection points with fitting 72, with each of those connection points being formed by or including a bolted flange joint with valve housing 34 and aftercooler 28, respectively. A third connection point is formed between strongarm 76 and electrical valve actuator 52 by way of clamp 78.

Shutoff valve assembly 32 further includes a sensing subsystem 80 that is structured to monitor a state of shutoff valve 33. As shown in FIG. 1, a first sensing subsystem 80 is shown as part of shutoff valve assembly 32, and a second sensing subsystem 180 as part of shutoff valve assembly 132. Sensing subsystems 80 and 180 may be substantially identical, although one might be right-handed and the other left-handed, for instance. An electronic control unit 81 is also depicted in FIG. 1 and shown in communication with sensing subsystem 80 and sensing subsystem 180. Electronic control unit 81 can include an engine control unit, or another onboard computer in an engine system or other machine system. It can be desirable for an engine control unit to be informed as to a present state of shutoff valves in a fluid supply system for various reasons, but at least for the reason that various engine operating and control strategies are based on an assumption that airflow to an engine is not normally obstructed by a shutoff valve. In a dual, parallel path engine air supply system such as fluid supply system 30 tripping of one of shutoff valve assemblies 32 and 132 without tripping the other could result in engine 12 continuing to operate but in a crippled or semi-crippled, or otherwise unexpected or undesired, state. Accordingly, positive determination that a shutoff valve has tripped, whether the tripping was intentional or not, is desirable from the standpoint of optimal operation of any machine system within the context of the present disclosure.

To this end, sensing subsystem 80, and by analogy sensing subsystem 180, includes a sensor target assembly 82 having a sensor target 84 located outside of valve housing 34, and a rotator 86 defining a center axis or axis of rotation 87 as shown in FIG. 2. Rotator 86 extends through valve housing 34 and couples sensor target 84 to valve member 50, such that sensor target 84 rotates in response to the moving of valve member 50 from the open position to the closed position. Sensor target 84 will typically, but not necessarily, be fixed to rotate with valve member 50. Sensing subsystem 80 further includes a proximity sensor 88 located outside of valve housing 34 and structured to produce a valve closing signal based on the rotation of sensor target 84 in response to the moving of valve member 50 between the open position and the closed position. Proximity sensor 88 can include a non-contact proximity sensor, for instance an inductive proximity sensor, or a Hall effect sensor or the like where perturbation of a magnetic field produces a change in an output voltage of the sensor according to well-known principles. An electrical connector 89 is shown coupled with sensor 88 for connecting with electronic control unit 81, and is in electrical communication with an electromagnetic transducer 90 of sensor 88 shown in FIG. 3. It will be understood that rotation of sensor target 84, which will typically be formed of an electrically conductive metal or metallic material, or potentially a magnetic material depending upon sensor type, can cause electromagnetic transducer 90 to vary its output based on a change in proximity of sensor target 84. In other instances a different sensor type could be employed, such as potentially certain optical sensors or cameras, or laser sensors. It is nevertheless contemplated that an electromagnetic transducer sensor provides an economical and practical implementation strategy, for reasons that will be further apparent from the following description.

As noted above, rotator 86 couples sensor target 84 to valve member 50. In the illustrated embodiment rotator 86 includes a pivot pin supporting valve member 50 within valve housing 34. Valve member 50 can therefore be understood to pivot or rotate about axis 87 in some embodiments, with rotator 86 extending through and out of valve housing 34 as shown in FIG. 2 and FIG. 4. In a practical implementation strategy, rotator 86 includes a reset hex 91 for shutoff valve 32, and sensor target 84 is releasably mounted to reset hex 91.

Figure 5:
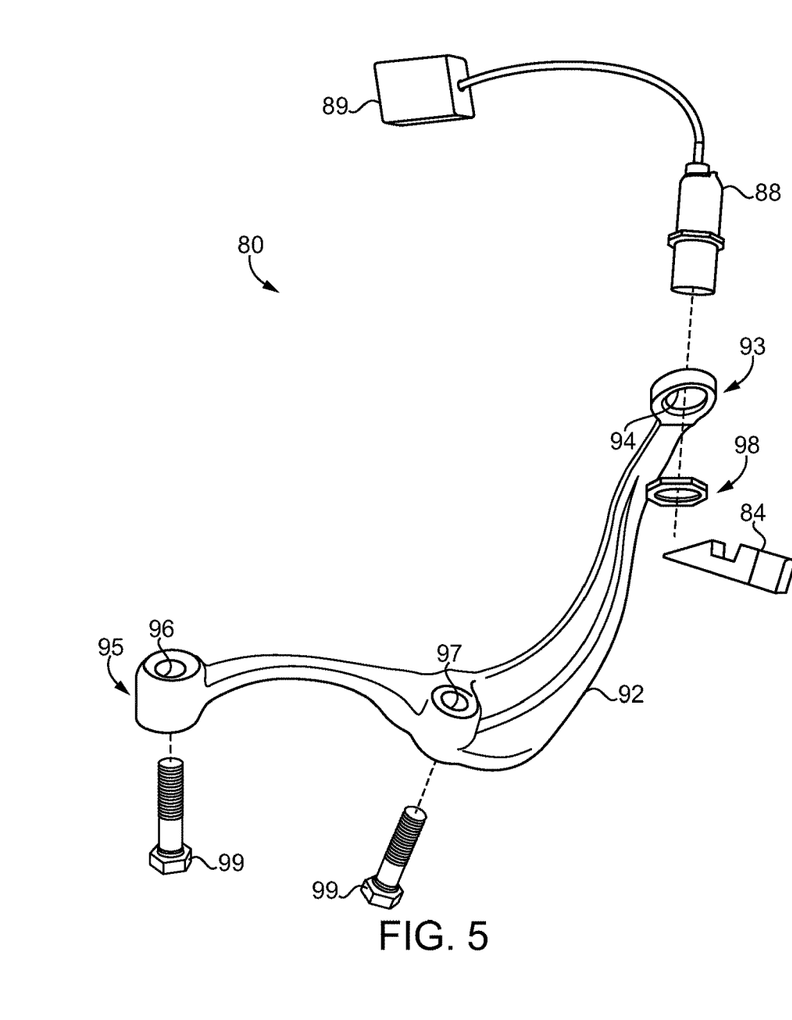
FIG. 5 is a disassembled view of a sensing subsystem, according to one embodiment.

Referring now to FIG. 5, there are shown certain components of sensing subsystem 80 disassembled, including sensor 88, sensor target 84, and a support arm 92 structured for supporting sensor 88 at a location outside of valve housing 34. As discussed above the environment of certain fluid supply systems, such as a turbocharged air supply system for an engine, can be harsh and associated with relentless vibration of varying frequencies and amplitudes, as well as relatively high temperatures. A shutoff valve housing receiving compressed intake air from a turbocharger can be 200° C., or higher. Certain sensors can be relatively sensitive to extremes of temperature and, while high temperature sensors are available, they may not be economical or not be as reliable as lower temperature sensor types having decades of field service application. Support arm 92, as best depicted in FIG. 4, can be bolted to stabilizer 70 and/or bolted to valve housing 34, and traverses a three-dimensional path through space to suspend sensor 88 at a location outside of valve housing 34, where temperatures can be significantly cooler, such as about 85-90° C. or less. Sensor 88 can also be protected from vibrational perturbation by way of the stabilization of shutoff valve assembly 32 achieved with stabilizer 70, grommet 79, and other components. It can further be noted that support arm 92 has a first end 93 having a first hole 94 formed therein, a second end 95 having a second hole 96 formed therein, a middle hole 97, and traverses a three-dimensional path among first hole 94, middle hole 97, and second hole 96. First hole 94 may be structured to receive sensor 88, and one or more hex nuts 98 or other suitable fastening elements can be provided for clamping sensor 88 to support arm 92 within first hole 94. Second hole 96 can include a bolting hole structured to receive a bolt 99, and middle hole 97 can include another bolting hole structured to receive another bolt 99. It should be appreciated that other suitable apparatus and arrangements could be employed to suspend sensor 88 at a working location generally in proximity to reset hex 91.

Figure 6:
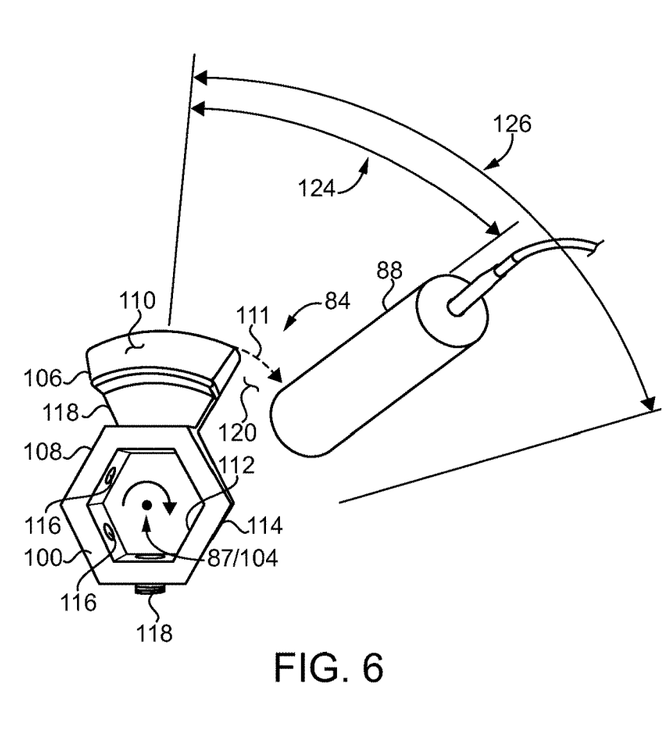
FIG. 6 is a diagrammatic view of parts of a sensing subsystem, according to one embodiment.

Referring also now to FIG. 6, there are shown additional features of sensor target 84 and in further detail. Sensor target 84 may be single-piece machined and/or cast component including a base 100 having an aperture 102 formed therein that receives rotator 86. Aperture 102 defines a center axis 104 that can be collinear with axis 87 when sensor target 84 is positioned for service. Sensor target 84 further includes a head 106, and a neck 108 attaching head 106 to base 100. Head 106 includes a target surface 110 that can be an arcuate target surface defining an arc 111 that extends circumferentially around center axis 104. It can further be noted that base 100 has an inner surface 112 defining aperture 102, and an outer surface 114. Inner surface 112 forms an inner hex shape. It can therefore be appreciated that aperture 102 can be sized and shaped to enable sensor target 84 to slip over a preexisting reset hex 91 used to reset shutoff valve 33 by rotation back to an open position after tripping. It will further be appreciated that sensing subsystem 80 can be retrofitted to existing shutoff valves in the field without requiring any modification or only minimal modification of the existing shutoff valve. In certain known designs, shutoff valve sensing or monitoring systems had direct mechanical connections with internal components of the shutoff valve, making those sensing mechanisms susceptible to performance degradation or other problems linked with the health or wear state of the shutoff valve itself. Sensing subsystem 80 not only positions relatively sensitive components away from hot surfaces and protects those components from vibrations, sensing subsystem 80 can also be deployed with minimally intensive technical efforts.

It can also be noted from FIG. 6 that outer surface 114 forms an outer hex shape, such that sensor target 84 can be used as a new reset hex positioned on top of the existing reset hex 91. Neck 108 may be formed relatively thin in axial extent to enable a wrench or the like to be fitted over base 100 for such purposes. It can also be noted that aperture 102 can extend axially through base 100, although the present disclosure is not thereby limited and aperture 102 could extend only partially through base 100. As noted above sensor target 84 can be releasably attached to rotator 86. In one implementation, base 100 has a plurality of radial side holes 116 formed therein and communicating between inner surface 112 and outer surface 114. A plurality of set screws 118 are positionable within the plurality of radial side holes 116. Target surface 110 may slope toward center axis 104 as shown in FIG. 6. While a circular arcuate target surface is illustrated, other arcuate shapes are contemplated, or other target surface shapes that are not arcuate at all. Depending upon shutoff valve design, packaging, available clearance and other factors, target surface 110 might be oriented so as to have a constant radial distance from center axis 104, in other words being placed upon an outer periphery of sensor target 84. In still other instances, target surface 110 could be an inside perimetric surface of a sensor target head.

INDUSTRIAL APPLICABILITY

Referring to the drawings generally, but with continued reference to FIG. 6, when it is desirable to actuate shutoff valve 33, or when shutoff valve 33 experiences a false trip, valve member 50 will begin to rotate or pivot from its open position toward its closed position. Sensor target 84, located outside of shutoff valve 33, will begin to rotate from a first position toward a second position in response to moving valve member 50 from an open position toward a closed position. A clearance 120 extends between sensor 88 and sensor target 84 at the first position, approximately as shown in FIG. 6. Sensor target 84 can rotate about a pivot angle 124 from the first position to the second position, such that clearance 120 changes, as sensor target 84 approaches sensor 88.

Another way to understand this principle is that a first clearance extends between sensor target 84 and sensor 88 at a first position of sensor target 84 when valve member is at the open position, and a second clearance different from the first clearance extends between sensor target 84 and proximity sensor 88 at a second position of sensor target 84 occupied when valve member 50 is moved part way from the open position to the closed position. The first clearance will typically be larger than the second clearance. Shortly after valve member 50 begins moving from the open position toward the closed position, sensor target 84 will have completed moving from the first position to the second position. In FIG. 6, a first pivot angle 124 between the open and closed positions of valve member 50 is larger than a second pivot angle 126 between the first and second positions of sensor target 84. In this general way sensing subsystem 80 can detect initiation of rotation of sensor target 84 from its first position, enabling detection of valve member 50 moving away from its open position. As such, the valve closing signal produced by sensor 88 may be indicative that shutoff valve 33 is closing, not that shutoff valve 33 has already closed. Certain known shutoff valve monitoring strategies relied upon detecting closing of a shutoff valve instead of detecting initiating closing of the shutoff valve. When sensor target 84 reaches the first position, valve member 50 may have just recently moved away from its open position. It is therefore possible to detect not only situations where a shutoff valve has been tripped and successfully closed, but also scenarios where a shutoff valve has closed part way, stuck at an open position when tripping is attempted, or otherwise failed to perform as intended.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A shutoff valve assembly for a fluid supply system comprising:
   a shutoff valve including a valve housing having a fluid conduit formed therein, and a valve member movable within the valve housing between an open position and a closed position to selectively shutoff fluid flow through the fluid conduit;
   an electrical valve actuator;
   a stabilizer for the electrical valve actuator, the stabilizer including a fitting coupled to the valve housing and forming an inlet to the fluid conduit, and a strongarm extending between the fitting and the electrical valve actuator;
   a sensor target assembly including a sensor target located outside of the valve housing, and a rotator;

the rotator extending through the valve housing and coupling the sensor target to the valve member, such that the sensor target rotates in response to the moving of the valve member; and a proximity sensor located outside of the valve housing and structured to produce a valve closing signal based on the rotation of the sensor target in response to the moving of the valve member.

2. The shutoff valve assembly of claim 1 wherein the proximity sensor includes a non-contact proximity sensor.

3. The shutoff valve assembly of claim 2 wherein the non-contact proximity sensor includes an electromagnetic transducer.

4. The shutoff valve assembly of claim 2 wherein a first clearance extends between the sensor target and the proximity sensor at a first position of the sensor target occupied when the valve member is at the open position, and a second clearance different from the first clearance extends between the sensor target and the proximity sensor at a second position of the sensor target occupied when the valve member is moved part way from the open position to the closed position.

5. The shutoff valve assembly of claim 4 wherein the first clearance is larger than the second clearance such that the sensor target approaches the proximity sensor by way of rotating from the first position to the second position.

6. The shutoff valve assembly of claim 4 wherein:
each of the valve member and the sensor target pivots about an axis of rotation of the rotator between the respective open and closed and first and second positions; and
a first pivot angle between the open and closed positions of the valve member is larger than a second pivot angle between the first and second positions of the sensor target.

7. The shutoff valve assembly of claim 1 wherein the valve member includes a gate valve member movable across the fluid conduit between the open position and the closed position, and wherein the rotator includes a pivot pin supporting the gate valve member within the valve housing.

8. The shutoff valve assembly of claim 7 wherein the rotator includes a reset hex for the shutoff valve, and the sensor target is releasably mounted to the reset hex.

9. The shutoff valve assembly of claim 8 wherein the sensor target includes a base coupled to the rotator, a head, and a neck attaching the head to the base, and the head including an arcuate target surface defining an arc that extends circumferentially around an axis of rotation of the rotator.

10. A sensing subsystem for monitoring a shutoff valve in a fluid supply system comprising:
a proximity sensor;
a support arm having a first end structured for receiving the proximity sensor and suspending the proximity sensor outside a valve housing of the shutoff valve, and a second end structured for mounting the support arm to the valve housing;
a sensor target including a base having an aperture formed therein that defines a center axis, for receiving a rotator that extends through the valve housing to transmit a rotation of a valve member in the shutoff valve to the sensor target;
the sensor target further including a head coupled to the base; and
the head including a target surface defining an arc that extends circumferentially around the center axis, and wherein the target surface is arcuate and is sloped toward the center axis.

11. The sensing subsystem of claim 10 wherein the base includes an inner surface defining the aperture, and an outer surface, and wherein the inner surface forms an inner hex shape.

12. The sensing subsystem of claim 11 wherein the outer surface forms an outer hex shape.

13. The sensing subsystem of claim 10 wherein the base has a plurality of radial side holes communicating between the inner surface and the outer surface, and further comprising a plurality of set screws positionable within the plurality of radial side holes.

14. The sensing subsystem of claim 10 wherein the proximity sensor includes a non-contact sensor having an electromagnetic transducer.

15. The sensing subsystem of claim 10 wherein the support arm includes a first hole formed in the first end and the sensor is mounted to the first end by way of the first hole, a second hole formed in the second end, and a middle hole, and traverses a three-dimensional path between the first hole and the second hole.

16. A method of monitoring a shutoff valve in a fluid supply system comprising:
rotating a sensor target located outside of a valve housing of the shutoff valve in response to moving a valve member in the shutoff valve between an open position and a closed position, wherein the rotating of the sensor target further includes rotating a sensor target mounted upon a reset hex coupled with a pivot pin supporting the valve member in the valve housing;
sensing the rotation of the sensor target by way of a proximity sensor suspended by a support arm at a location outside of the valve housing of the shutoff valve; and
outputting a valve closing signal from the proximity sensor based on the sensing of the rotation of the sensor target.

17. The method of claim 16 wherein the sensing of the rotation of the sensor target further includes sensing rotation of the sensor target that is indicative of initiating moving the valve member from an open position to a closed position.

* * * * *